(12) United States Patent
Hampiholi et al.

(10) Patent No.: US 10,878,787 B2
(45) Date of Patent: Dec. 29, 2020

(54) DRIVER ASSISTANCE SYSTEM

(71) Applicant: Harman International Industries, Incorporated, Stamford, CT (US)

(72) Inventors: Vallabha Vasant Hampiholi, Bangalore (IN); Arvin Baalu, Bangalore (IN); Sharath Chandrashekar, Bangalore (IN)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 1063 days.

(21) Appl. No.: 14/464,486

(22) Filed: Aug. 20, 2014

(65) Prior Publication Data

US 2015/0053066 A1 Feb. 26, 2015

Related U.S. Application Data

(60) Provisional application No. 61/867,682, filed on Aug. 20, 2013.

(51) Int. Cl.
*G10H 1/00* (2006.01)
*G10H 1/46* (2006.01)
(Continued)

(52) U.S. Cl.
CPC ........... *G10H 1/0008* (2013.01); *B60K 37/06* (2013.01); *B60W 50/14* (2013.01);
(Continued)

(58) Field of Classification Search
CPC .. B60K 35/00; B60K 2350/1052; G06F 3/017
See application file for complete search history.

(56) References Cited

U.S. PATENT DOCUMENTS 6,731,925 B2* 5/2004 Naboulsi ................. B60R 11/02
455/345
7,343,234 B2* 3/2008 Kameyama ......... B60R 16/0373
340/425.5
(Continued)

FOREIGN PATENT DOCUMENTS

CN 1798521 A 7/2006
CN 101516710 A 8/2009
(Continued)

OTHER PUBLICATIONS

Christian Jones, et al. , "Automatic Recognition of Affective Cues in the Speech of Car Drivers to Allow Appropriate Responses," Proceedings of OZCHI 2005, Canberra, Australia. Nov. 23-25, 2005. (Year: 2005).*

(Continued)

*Primary Examiner* — James T Tsai
(74) *Attorney, Agent, or Firm* — McCoy Russell LLP

(57) ABSTRACT

Methods are provided for adjusting a music output of a vehicle audio system based on driver movements performed while listening to the music. In one embodiment, a music output of a vehicle infotainment system is adjusted responsive to monitored user behavior inside a vehicle, the monitored user behavior manifesting a user mood. In another embodiment, the music output is adjusted based on each of a user mood and a control gesture, wherein both the user mood and the gesture are identified based on user information gathered from vehicle biometric sensors and cameras while music is playing inside the vehicle.

18 Claims, 6 Drawing Sheets

(51) Int. Cl.
*B60K 37/06* (2006.01)
*B60W 50/14* (2020.01)
*G06K 9/00* (2006.01)

(52) U.S. Cl.
CPC .......... *G06K 9/00845* (2013.01); *G10H 1/46* (2013.01); *B60K 2370/146* (2019.05); *G10H 2220/201* (2013.01)

(56) References Cited

U.S. PATENT DOCUMENTS

| | | | |
|---|---|---|---|
| 2003/0060728 A1 | 3/2003 | Mandigo | |
| 2003/0078919 A1* | 4/2003 | Suzuki | G06F 17/30017 |
| 2003/0159567 A1* | 8/2003 | Subotnick | G06F 3/017 |
| | | | 84/626 |
| 2007/0089125 A1* | 4/2007 | Claassen | H04H 60/33 |
| | | | 725/9 |
| 2007/0127737 A1* | 6/2007 | Lee | H03G 3/32 |
| | | | 381/94.3 |
| 2010/0063697 A1* | 3/2010 | Lindgren | B60W 10/06 |
| | | | 701/59 |
| 2010/0069697 A1* | 3/2010 | Elmore | B01D 15/00 |
| | | | 588/9 |
| 2010/0134302 A1* | 6/2010 | Ahn | A61B 5/18 |
| | | | 340/576 |
| 2011/0040707 A1* | 2/2011 | Theisen | G11B 27/105 |
| | | | 706/12 |
| 2011/0106375 A1* | 5/2011 | Gurusamy Sundaram | |
| | | | H04W 4/00 |
| | | | 701/31.4 |
| 2011/0224875 A1 | 9/2011 | Cuddihy et al. | |
| 2012/0105257 A1* | 5/2012 | Murillo | G06F 3/017 |
| | | | 341/20 |
| 2013/0066526 A1* | 3/2013 | Mondragon | G09G 5/00 |
| | | | 701/48 |
| 2013/0116856 A1* | 5/2013 | Schadeck | B60K 28/06 |
| | | | 701/1 |
| 2013/0142019 A1* | 6/2013 | Itou | G11B 31/003 |
| | | | 369/7 |
| 2013/0204457 A1* | 8/2013 | King | B60K 28/06 |
| | | | 701/1 |
| 2013/0275924 A1* | 10/2013 | Weinberg | G06F 3/017 |
| | | | 715/863 |
| 2013/0311038 A1* | 11/2013 | Kim | G01C 21/3641 |
| | | | 701/36 |
| 2014/0119563 A1* | 5/2014 | Caskey | G06F 17/30764 |
| | | | 381/86 |
| 2016/0098088 A1* | 4/2016 | Park | G06K 9/00355 |
| | | | 345/156 |

FOREIGN PATENT DOCUMENTS

| | | | | |
|---|---|---|---|---|
| CN | 103093647 A | | 5/2013 | |
| DE | 102004011953 A1 | | 9/2005 | |
| DE | 102009032735 A1 | * | 2/2010 | .......... B60R 16/037 |
| EP | 2591969 A1 | | 5/2013 | |
| WO | 2006085287 A2 | | 8/2006 | |

OTHER PUBLICATIONS

McCraty, R. et al., "The Effect of Different Types of Music on Mood, Tension, and Mental Clarity," Alternative Therapies, vol. 4, No. 1, pp. 75-84, Jan. 1998, 10 pages.

Dibben, N. et al., "An Exploratory Survey of In-Vehicle Music Listening," Psychology of Music, vol. 35, No. 4, pp. 571-589, Published Oct. 2007, Available Online Aug. 16, 2007, 20 pages.

Van Der Zwaag, M. et al., "The Influence of Music on Mood and Performance While Driving," Ergonomics, vol. 55, No. 1, pp. 12-22, Jan. 2012, 11 pages.

Van Der Zwaag, M., "Music Directs Your Mood," Doctoral Thesis in Behavioural and Social Sciences at the University of Groningen, Netherlands, Apr. 2012, 177 pages.

Louisson, P., "Death Metal—When Music Kills," http://www.stuff.co.nz/motoring/blogs/the-car-club/7050750/Death-metal-when-music-kills, Updated Aug. 6, 2012, Available as early as Jun. 8, 2012, 3 pages.

"Listening to Music Can Contribute to Accidents on the Road," http://www.accidentadvicehelpline.co.uk/blog/listening-to-music-can-contribute-to-accidents-on-the-road/, Sep. 19, 2012, 3 pages.

European Patent Office, Extended European Search Report Issued in Application No. 14181423.6, dated Jun. 8, 2015, Germany, 6 pages.

State Intellectual Property Office of the People's Republic of China, Office Action and Search Report Issued in Application No. 201410412014.4, dated Aug. 2, 2017, 24 pages. (Submitted with Translation of Office Action).

* cited by examiner

DRIVER ASSISTANCE SYSTEM

CROSS-REFERENCE TO RELATED APPLICATIONS

The present application claims priority to U.S. Provisional Application No. 61/867,682, filed Aug. 20, 2013 and entitled DRIVER ASSISTANCE SYSTEM, the entire contents of which are hereby incorporated by reference for all purposes.

FIELD

Embodiments of the subject matter disclosed herein relate to driver assistance systems, and more particularly, to an in-vehicle computing system and associated controls that are actuated responsive to an operator's mood.

BACKGROUND AND SUMMARY

Vehicles may be equipped with entertainment systems that enable a user to listen to music while operating the vehicle. The music may be received from various sources and may correspond to various genres. For example, a user may listen to music being streamed from a radio station, or select music from a user playlist. By playing music, the user can alter an in-vehicle ambience while driving. However, research has shown that some drivers admit to music being a distraction. As such, the distraction may lead to a vehicle safety issue, such as an increased likelihood of vehicle collisions.

This disclosure recognizes the above issue and provides an approach to address the issue. As an example, a system is provided whereby music played on an in-vehicle entertainment system is adjusted responsive to a driver's mood, as inferred based on a historical monitoring of a user's behavior, such as user body motion, so as to avoid potential reckless driving. The proposed system may include additional advanced features that enable automatic controlling of a vehicle speed if a vehicle controller determines the driver's mood to be below a threshold for a prolonged period, where it is more prone to erratic behavior and reckless driving.

The inventors herein have recognized that music can affect a person's cognitive state. In particular, music can affect human emotions, mood states, as well as their driving behavior (or driving performance). Further still, music can have an effect on a user's physiological parameters, such as muscle tension, respiration rate, heart beat, blood pressure, etc. As an example, listening to music from genres having a higher tempo (such as reggae, hip-hop, heavy metal, rock, etc.) at a high volume for prolonged durations can lower a user's cognitive state and destabilize the person. If the person was listening to such music while driving a vehicle, their driving pattern may also be destabilized. For example, the driver's response time to driving events may be affected, resulting in a higher propensity for vehicle collisions. Accordingly, a driver assistance system (DAS), or driver assistance module of a vehicle control system, as disclosed herein, may be configured to use input from various vehicles sensors, such as biometric sensors, vehicle speed sensors, cameras, etc., and vehicle settings, such as entertainment system settings, to gauge the user's cognitive state, such as the driver's mood. The DAS may also monitor the driver's driving performance, such as whether the driver is driving aggressively or passively. This may include determining if the user is consistently driving within a lane or frequently departing from the lane, whether the user is adhering to proscribed speed limits, or speeding, whether the user is frequently overtaking other vehicles, etc. Based on the user behavior being lower than a threshold, indicative of the driver's mood being prone to reduced driving performance and risky driving maneuvers, the driver assistance system or module may adjust a content of music being streamed inside the vehicle cabin so as to improve the user's mood. For example, a music playlist may be changed by removing or skipping songs with a higher tempo while adding or repeating songs with a lower tempo to alter the driver's mood, and improve their driving performance. The adjustment may be based on the current music listening habits of the driver and further based on monitored driving skills to thereby avoid erratic driving and user behavior in a vehicle. Examples of such a system are illustrated in the attached figures.

It is to be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

It is to be further understood that the following description of examples of implementations are given only for the purpose of illustration and are not to be taken in a limiting sense. The partitioning of examples in function blocks, modules or units illustrated in the drawings is not to be construed as indicating that these function blocks, modules or units are necessarily implemented as physically separate devices or a single physical device. Functional blocks, modules or units illustrated or described may be implemented as separate devices, circuits, chips, functions, modules, or circuit elements. One or more functional blocks, modules, or units may also be implemented in a common circuit, chip, circuit element or device.

BRIEF DESCRIPTION OF THE FIGURES

The disclosure may be better understood from reading the following description of non-limiting embodiments, with reference to the attached drawings, wherein below.

DETAILED DESCRIPTION

The present description relates to driver assistance systems and modules that may be used to adjust a music output of an in-vehicle infotainment system, such as those of FIGS.

1-2, to reduce risky driving associated with bad user mood. A vehicle controller may perform a control routine, such as the routine of FIGS. 3-4 to infer a user mood based on user behavior, such as user body motion and body position, monitored while music is streaming into the vehicle. In particular, based on the user body motion relative to an aspect of the streaming music, the controller may determine whether the user's behavior is a manifestation of poor mood and potentially reckless driving. The controller may also recognize and distinguish body motions representative of control gestures from those indicative of user mood, and adjust vehicle music settings accordingly, as elaborated at FIG. 5. Further still, actuation of vehicle control elements based on recognized control gestures may be adjusted based on inferred user mood. An example adjustment is shown with reference to FIG. 6.

Figure 1:
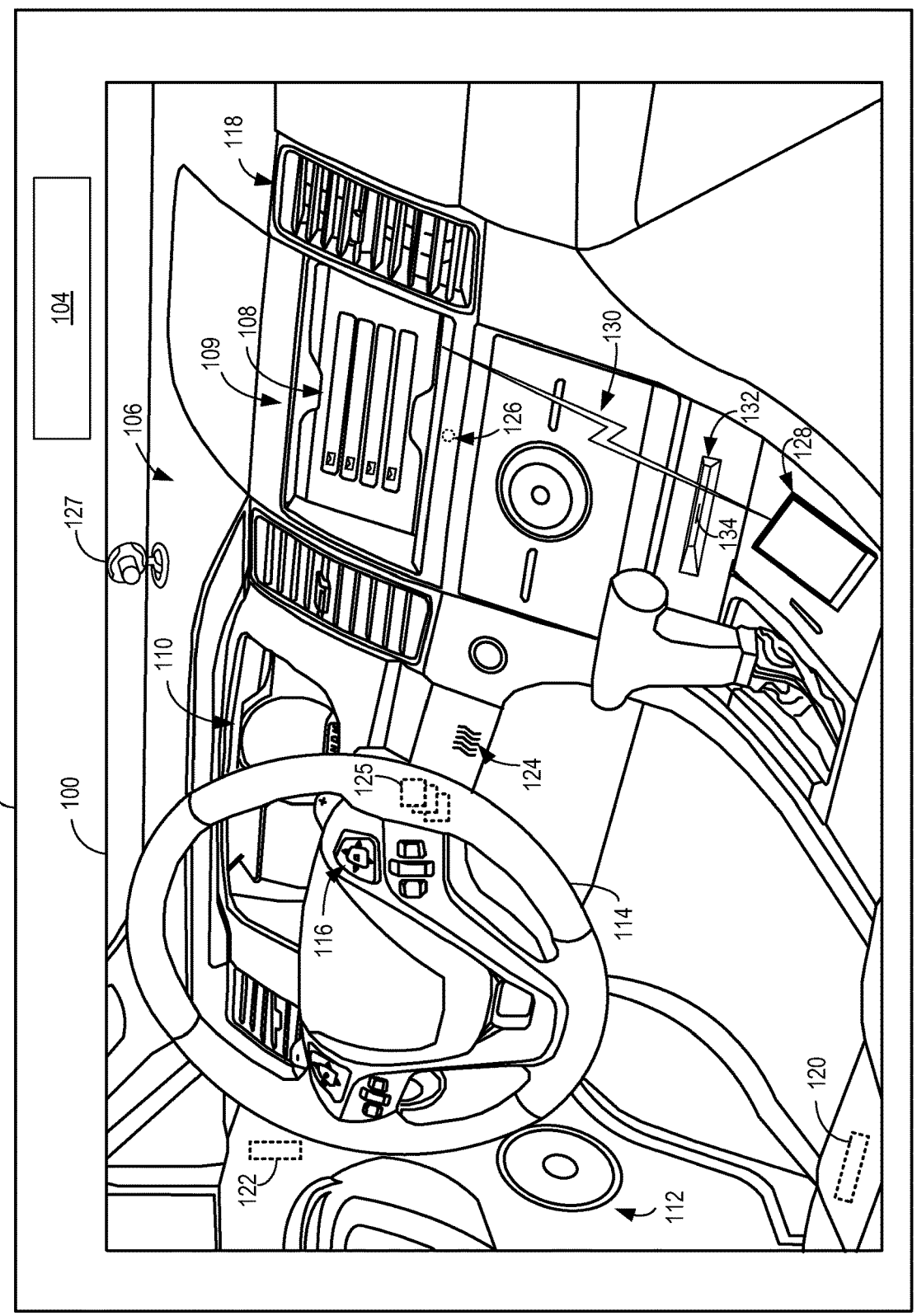
FIG. 1 is a partial view of a vehicle cabin including an in-vehicle computing system, in accordance with one or more embodiments of the present disclosure.

FIG. 1 shows an example partial view of a vehicle environment: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system or infotainment system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via an external device, such as mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate (such as cabin temperature) via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. Further still, the vehicle may include one or more biometric sensors 125 for monitoring the user or driver. The one or more biometric sensors 125 may include eye position sensors, face position sensors, basal body temperature sensors, heart rate sensors, etc. The biometric sensors may be coupled in various locations in the vehicle wherefrom user monitoring may be facilitated. As a non-limiting example, the biometric sensors are shown embedded in steering wheel 114 in the current depiction. A camera 127 may also be included in the vehicle cabin for monitoring user behavior, such as a change in user body position or body motion (when viewing inside the cabin) and for further monitoring a user driving behavior, such as user driving maneuvers (when viewing outside the cabin).

A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle computing system and connected via a substantially external communication link (e.g., a cable or radiofrequency signal), it is to be understood that a slot 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the computing system.

In-vehicle computing system 109 may analyze the input received from sensors 125, camera 127, and other input devices (such as mobile device 128) and select settings for various in-vehicle systems (such as climate control system, audio system, or infotainment system), provide output via touch screen 108 and/or speakers 112, communicate with mobile device 128 and/or perform other actions based on the assessment. In some embodiments, all or a portion of the assessment may be performed by the mobile device 128.

Further still, in-vehicle computing system 109 may recognize a pre-programmed control gesture performed by the vehicle operator based on input received from the sensors and the camera and control a vehicle element in accordance with a pre-programmed control action associated with the gesture. Control gestures and related control actions may be learned during a calibration phase, and/or iteratively during vehicle operation. Further still, the controller may have a default set of control gestures and associated related control actions stored in the controller's memory based on standard gestures and actions. For example, the controller may have instructions stored in the memory for increasing a volume of the audio system output in response to a swiping gesture going from a left direction to a right direction, and for decreasing a volume of the audio system output in response to a swiping gesture going from a right direction to a left direction. The controller may then further learn a user's unique way of swiping and/or curvature of swiping for the given gesture. As further elaborated herein, the controller may also learn a user's distinct swiping gesture (or trajectory) performed while the user is in what is inferred to be a "good mood" relative to the swiping gesture performed while the user is in what is inferred to be a "bad mood".

In vehicle computing system 109 may also be configured to monitor user behavior based on input received from the various sensors and cameras. The input may be monitored historically, in relation to a music output by the audio system into the vehicle cabin. By correlating aspects of the music, such as a tempo, volume, or bass component of the music, with the user behavior, such as user body motion, the controller may determine a user mood or mood index. Based on the user mood, and further based on correlation between the user's mood and the user's driving performance, the controller may adjust the music output to improve the user mood and thereby the user's driving performance.

Figure 2:
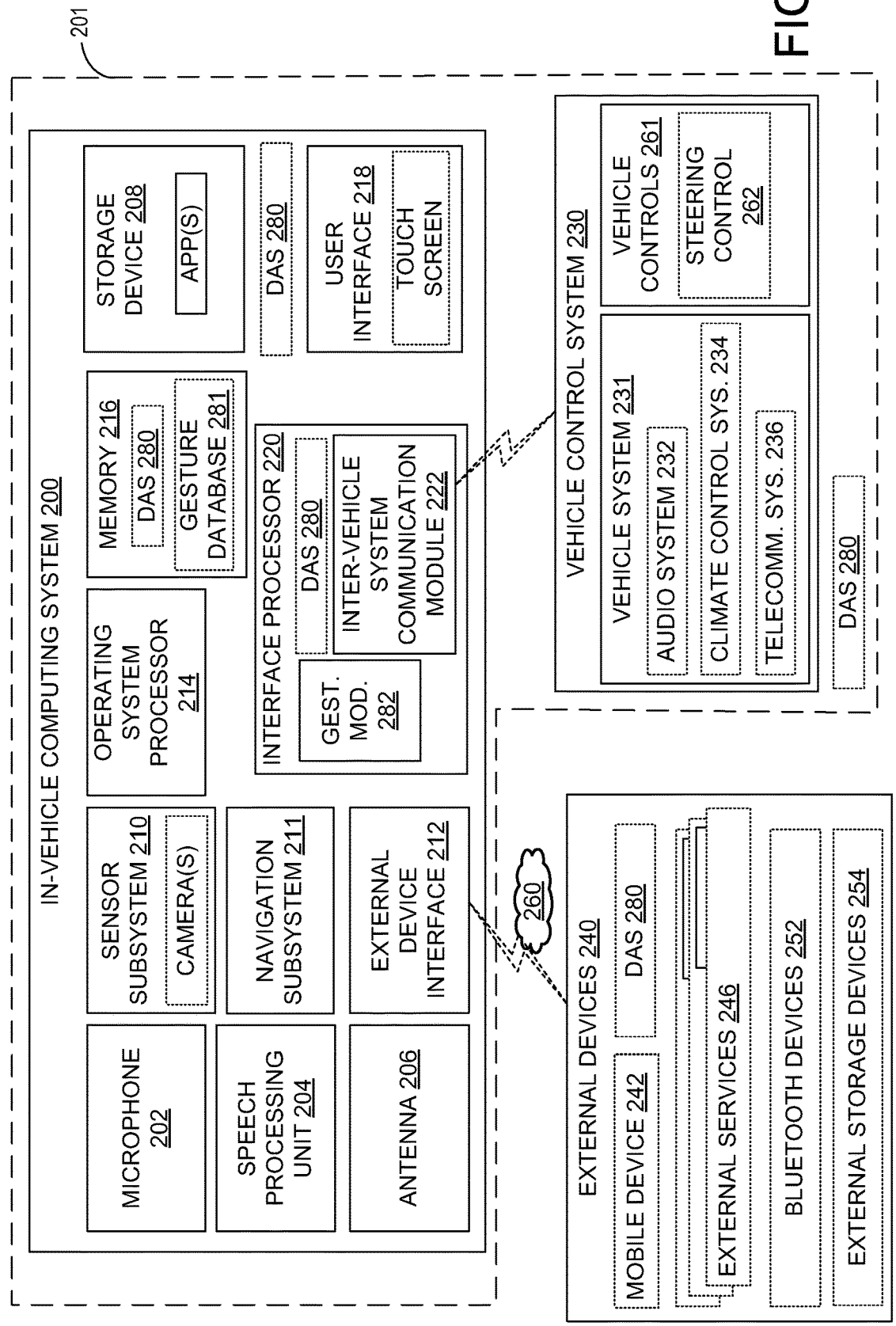
FIG. 2 shows a block diagram of an in-vehicle computing system, in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1 in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, subsystems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 300 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 300. For example, the sensor subsystem 210 may include a camera, such as a rear view camera for assisting a user in parking the vehicle and/or a cabin camera for identifying a user (e.g., using facial recognition and/or user gestures). Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link.

One or more applications may be operable on mobile device 242 to aggregate user data regarding interactions of the user with the mobile device. For example, a mobile device application may aggregate data regarding music playlists listened to by the user on the mobile device, telephone call logs (including a frequency and duration of telephone calls accepted by the user), positional information including locations frequented by the user and an amount of time spent at each location, etc. Likewise, one or more applications may be operable on external services 246 to aggregate and/or analyze data from multiple data sources.

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 22 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/ clutch pedals, a gear shift, door/window controls positioned in a driver or passenger door, seat controls, cabin light controls, audio system controls, cabin temperature controls, etc. The control signals may also control audio output at one or more speakers of the vehicle's audio system 232. For example, the control signals may adjust audio output characteristics such as volume, equalization, bass output, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 220 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna (s) 206 or via infrared or other means through appropriate receiving devices. In some embodiments, antenna 206 may be included as part of audio system 222 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. Further still, elements of vehicle system 231 may be controlled in response to pre-programmed control gestures performed by the user and recognized by interface processor based on input from sensors and cameras of sensor subsystem 210. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Interface processor 220 of in-vehicle computing system 109 may include a gesture module 282 for recognizing a pre-programmed control gesture performed by the vehicle operator, from a series of gestures stored in a gesture database 281 in the controller's memory, based on input received from the sensors and the cameras of the sensor subsystem and control a vehicle element in accordance with a pre-programmed control action associated with the gesture. Control gestures and related control actions may be learned during a calibration phase, and/or iteratively during vehicle operation. Further still, the controller may have a default set of control gestures and associated related control actions stored in the controller's memory based on standard gestures and actions. For example, the controller may have instructions stored in the memory for increasing a volume of the audio system output in response to a swiping gesture going from a left direction to a right direction, and for decreasing a volume of the audio system output in response to a swiping gesture going from a right direction to a left direction. The controller may then further learn a user's unique way of swiping and/or curvature of swiping for the given gesture. As further elaborated herein, the controller may also learn a user's distinct swiping gesture (or trajectory) performed while the user is in what is inferred to be a "good mood" relative to the swiping gesture performed while the user is in what is inferred to be a "bad mood".

In vehicle computing system 109 may further include a driver assistance system 280 configured optionally as an external device coupleable into vehicle 201, or as a driver assistance system (DAS) module 280 coupled into various components of the in-vehicle system, such as memory 216, interface processor 220, and vehicle control system 230. DAS 280 may be configured to monitor user behavior based on input received from the various sensors and cameras. The input may be monitored historically, in relation to a music output by the audio system into the vehicle cabin. By correlating aspects of the music, such as a tempo, volume, or bass component of the music, with the user behavior, such as user body motion, the controller may determine a user mood or mood index. Based on the user mood, and further based on correlation between the user's mood and the user's driving performance, the controller may adjust settings of the audio system, such as the music output, to improve the user mood and thereby the user's driving performance.

In embodiments where DAS 280 is configured as electronic device, the device may include one or more aspects or modules the driver assistance system. The electronic device may include a set of instructions that can be executed to cause one or more modules of the electronic device to perform any of the methods and/or computer based functions disclosed herein. The electronic device may operate as a standalone device, may be included as functionality within a device also performing other functionality, or may be in communication with, such as using a network, to other computer systems, devices, or peripheral devices.

In the example of a networked deployment, the electronic DAS device may operate in the capacity of a server or a client user computer in a server-client user network environment, as a peer computer system in a peer-to-peer (or distributed) network environment, or in various other ways. The electronic device can also be implemented as, or incorporated into, various electronic devices, such as hand-held devices such as smartphones and tablet computers, portable media devices such as recording, playing, and gaming devices, household electronics such as smart appliances and smart TVs, set-top boxes, automotive electronics such as head units and navigation systems, or any other machine capable of executing a set of instructions (sequential or otherwise) that result in actions to be taken by that machine. The electronic device may be implemented using electronic devices that provide voice, audio, video and/or data communication. While a single device, such as an electronic device, is suggested, the term "device" may include any collection of devices or sub-devices that individually or jointly execute a set, or multiple sets, of instructions to perform one or more functions.

When configured as an electronic device, DAS 280 may include a processor, such as a central processing unit (CPU), a graphics processing unit (GPU), or both. The processor may be a component in a variety of systems. For example, the processor may be part of a head unit in a vehicle, such as a part of in-vehicle computing system 200. Also, the processor may include one or more general processors, digital signal processors, application specific integrated circuits, field programmable gate arrays, servers, networks, digital circuits, analog circuits, combinations thereof, or other now known or later developed devices for analyzing and processing data. The processor may implement a software program, such as code generated manually or programmed.

The electronic device may include memory, such as a memory that can communicate via a bus. The memory may be or include a main memory, a static memory, or a dynamic memory. The memory may include any non-transitory memory device. The memory may also include computer readable storage media such as various types of volatile and non-volatile storage media including random access memory, read-only memory, programmable read-only memory, electrically programmable read-only memory, electrically erasable read-only memory, flash memory, a magnetic tape or disk, optical media and the like. Also, the memory may include a non-transitory tangible medium upon which software may be stored. The software may be electronically stored as an image or in another format (such as through an optical scan), and compiled, or interpreted or otherwise processed. In one example, the memory may include a cache or random access memory for the processor. In alternative examples, the memory may be separate from the processor, such as a cache memory of a processor, the system memory, or other memory. The memory may be or include an external storage device or database for storing data. Examples include a hard drive, compact disc (CD), digital video disc (DVD), memory card, memory stick, floppy disc, universal serial bus (USB) memory device, or any other device operative to store data. For example, the electronic device may also include a disk or optical drive unit. The drive unit may include a computer-readable medium in which one or more sets of software or instructions, can be embedded. The processor and the memory may also include a computer-readable storage medium with instructions or software.

When included in the DAS device, the memory may be operable to store instructions executable by the processor. The functions, acts or tasks illustrated in the figures or described may be performed by the programmed processor executing the instructions stored in the memory. The functions, acts or tasks may be independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As elaborated below, the instructions may include the methods and/or logic described herein, including aspects or modules of the electronic device. The instructions may reside completely, or partially, in the memory or in the processor during execution by the electronic device. For example, software aspects or modules may include examples of various duplicate station detection processors that may reside completely, or partially, in the memory or in the processor during execution by the electronic device.

With respect to various duplicate station detection processors (or signal processors) that may be used by the OAS, hardware or software implementations of such processors may include analog and/or digital signal processing modules (and analog-to digital and/or digital-to-analog converters). The analog signal processing modules may include linear electronic circuits such as passive filters, active filters, additive mixers, integrators and delay lines. Analog processing modules may also include non-linear circuits such as comparators, multiplicators (frequency mixers and voltage-controlled amplifiers), voltage-controlled filters, voltage-controlled oscillators and phase-locked loops. The digital or discrete signal processing modules may include sample and hold circuits, analog time-division multiplexers, analog delay lines and analog feedback shift registers, for example. In other implementations, the digital signal processing modules may include ASICs, field-programmable gate arrays or specialized digital signal processors (OSP chips). Either way, such digital signal processing modules may enhance an image signal via arithmetical operations that include fixed-point and floating-point, real-valued and complex-valued, multiplication, and/or addition. Other operations may be supported by circular buffers and/or look-up tables. Such operations may include Fast Fourier transform (FFT), finite impulse response (FIR) filter, Infinite impulse response (IIR) filter, and/or adaptive filters.

The DAS module(s) or system described herein may include software, hardware, firmware, or some combination thereof executable by a processor. Software modules may include instructions stored in memory, or another memory device, that may be executable by the processor or other processors. Hardware modules may include various devices, components, circuits, gates, circuit boards, and the like that are executable, directed, or controlled for performance by the processor. It will be appreciated that the term "module" may include a plurality of executable modules.

Further, DAS 280 may include a computer-readable medium that may include the instructions or receives and executes the instructions responsive to a propagated signal so that a device in communication with network 260 can communicate voice, video, audio, images or any other data over the network. The instructions may be transmitted or received over the network via a communication port or interface, or using a bus. The communication port or interface may be a part of the processor or may be a separate component. The communication port or interface may be created in software or may be a physical connection in hardware. The communication port or interface may be configured to connect with the network, external media, one or more input/output devices, one or more sensors, or any other components in the DAS 280, or combinations thereof. The connection with the network may be a physical connection, such as a wired Ethernet connection or may be established wirelessly. The additional connections with other components of DAS 280 may be physical connections or may be established wirelessly. The network may alternatively be directly in communication with the bus.

Network 260 may include wired networks, wireless networks, Ethernet AVB networks, a CAN bus, a MOST bus, or combinations thereof. The wireless network may be or include a cellular telephone network, an 802.11, 802.16, 802.20, 802.1Q or WiMax network. The wireless network may also include a wireless LAN, implemented via WI-FI or BLUETOOTH technologies. Further, the network 260 may be or include a public network, such as the Internet, a private network, such as an intranet, or combinations thereof, and may utilize a variety of networking protocols now available or later developed including TCP/IP based networking protocols. One or more components of DAS 280 may communicate with each other by or through the network 260.

The one or more input/output devices may be configured to allow a user to interact with any of the components of the electronic DAS device. Such devices may be or be in communication with the user interfaces described herein. The one or more input/out devices may include a keypad, a keyboard, a cursor control device, such as a mouse, or a joystick. Also, the one or more input/out devices may include a microphone, one or more visual displays, speakers, remote controls, touchscreen displays, or any other devices operative to interact with the electronic device, such as any device operative to act as an interface between the electronic device and one or more users and/or other electronic devices.

Figure 3:
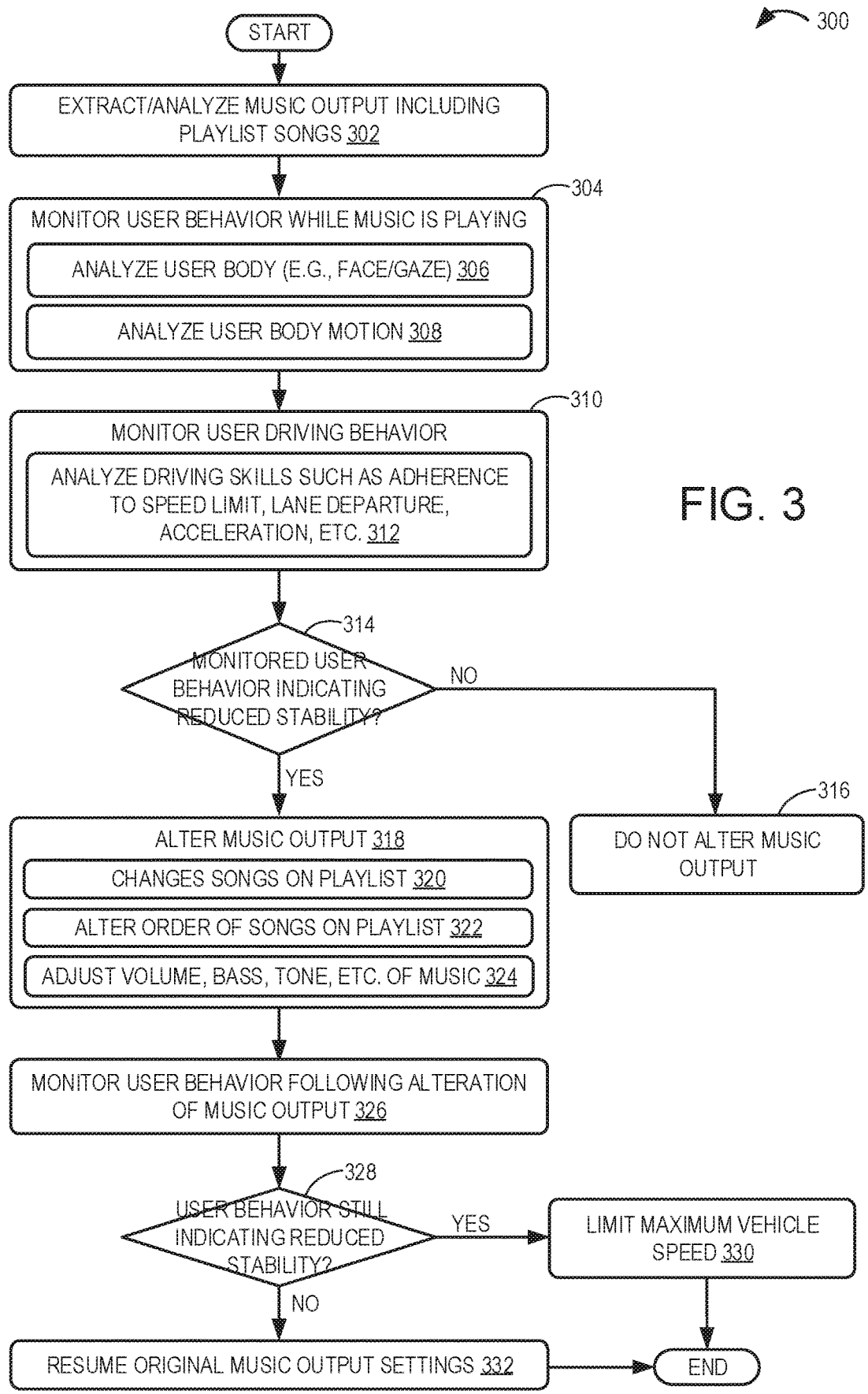
FIG. 3 shows a high level flow chart of a method for estimating a user mood and adjusting a music output of a vehicle infotainment system in accordance.

Now turning to FIG. 3, an example method 300 is shown for adjusting a music output of a vehicle entertainment or infotainment system responsive to monitored user behavior inside a vehicle, the monitored user behavior manifesting a user mood. The example operations of method 300 may be performed by at least one aspect of DAS 280 of in-vehicle computing system 200.

At 302, the routine includes extracting and/or analyzing a music output of the vehicle's audio system. For example, a DAS module of the vehicle control system may analyze the user music taste by music mood detection and song genre extraction. The analysis can occur for a predetermined time period, such as thirty minutes. The time period may be a time period since the audio system is initially operated. The time period can be configured by a user of the system, for example. In one example, where the music output of the audio system includes a playlist of songs, the DAS module may analyze each song by genre, tempo, bass content, singer, etc.

At 304, the routine includes monitoring user behavior while music is playing inside the vehicle. Monitoring user behavior may include monitoring and/or analyzing a user body part or body position at 306. Monitoring user behavior may alternatively or additionally include monitoring and/or analyzing a user body motion at 308. The user body position or user body motion may be monitored via one or more of cameras and biometric sensors coupled in the vehicle.

As one example, the DAS module may analyze the user face or eyes, thereby analyzing the user's face or gaze. The user body position or user body motion may be monitored historically in relation to the music output of the vehicle infotainment system. For example, the module may track the user's face or gaze to understand a user's behavior to different types of music and make a determination regarding whether the behavior is dangerous while driving. As an example, unsteady movements, irregular movements, dancing, or head-banging in a vehicle may be considered dangerous while driving, and the DAS module may consider such behavior erratic and risky. In contrast, stable behavior may include steady user movements, such as the user or driver facing forward with minimal movements to operate the vehicle and with both hands on the driving wheel. Based on the user behavior, the module may determine whether the user's behavior is stable or erratic. In addition, based on the user behavior manifesting user mood, the module may determine a user mood.

In some embodiments, the user body position or user body motion monitored may be a first body position or body motion that is indicative of user behavior, the first body motion or position distinct from a second user body position or motion indicative of a vehicle control actuating gesture. For example, the DAS module may monitor a face gaze to infer user behavior, while monitoring a finger motion to identify a control gesture. As elaborated at FIG. 6, the vehicle control system may be further configured to adjust a music output of the audio system differently responsive to the first body position or body motion as compared to the adjustment responsive to the second body position or body motion. Further, the controller may monitor the first body position or body motion historically in relation to the music output of the vehicle audio system but not monitor the second body position or body motion historically.

At 310, the routine includes monitoring a user driving behavior. The driving behavior of the user may be monitored concurrent to the monitoring of user body motion and while music from the audio system is streaming into the vehicle cabin. Monitoring driving behavior may include, at 312, monitoring and analyzing driving skills and vehicle operations performed by the user. For example, the DAS module may analyze the driver's adherence to speed limits, lane departure, acceleration patterns, etc. In doing so, the module may determine stable or erratic driving by the user. The module may sense and analyze the sensed data for frequent lane departures, erratic acceleration patterns, frequent speeding, and frequent overtakes.

In some embodiments, the DAS module may further collect additional information regarding the user, such as the driving record of the user and health related information. The music output alteration may then be further adjusted based on the collected additional data. For example, a user having more than a threshold number of tickets (e.g., speeding or parking tickets) may constitute a factor in the adjustment of the audio playback volume and/or playlist selection. Further still, the DAS module may store driver related information, such as driving behavior over time, driving ranking, driving history, etc.

At 314, it may be determined if the monitored user behavior (is indicative or reduced driver stability. For example, it may be determined if the monitored user behavior is below a threshold. In another example, a user stability index may be estimated based on the monitored user behavior, and it may be determined if the estimated user stability index is lower than a threshold, wherein being below the threshold is indicative of a user mood associated with reduced driver stability. In alternate examples, the DAS module may infer a number of possible moods of the user based on the monitored behavior and give a weightage to each of the possible moods based on the monitored behavior. Herein, the monitored behavior may include only the biometric user behavior, as monitored at 304, or a combination of the user biometric behavior and driving behavior (as monitored at 310).

If the monitored used behavior, or user stability index, is above the threshold, indicating the user behavior is not erratic and that the user mood is not associated with risky vehicle maneuvers, at 316, the routine maintains the music output of the audio system and does not alter the music output. For example, where the behavior is determined to be stable, the playlist selected by the user may continue to operate on the audio system without any changes. For example, the volume of the playlist may be maintained, an order of songs in the playlist may be maintained, etc.

In some embodiments, upon analysis of the music content by the DAS module (at 302), if it is determined that the music content is "stable" and the music content (e.g., genre or tempo) is not associated with potentially erratic or risky driving behavior, the playlist may continue to run without the DAS module performing a further analysis of the user's driving behavior.

If the monitored used behavior, or user stability index, is below the threshold, indicating the user behavior is erratic and that the user mood is associated with risky vehicle maneuvers, at 318, the routine includes automatically, and without further input from the vehicle operator, adjusting the music content of the music playing on the audio system. This may include, at 320, adjusting a content of the playlist. For examples, songs on the playlist having a faster tempo, a higher volume, a higher bass content, or songs belonging to a specific genre or singer/band may be temporarily removed or skipped. Further, songs having a slower tempo, a lower volume, a lower bass content, or songs belonging to an alternate genre or singer/band may be temporarily inserted or repeated. As another example, at 322, altering the music content may include adjusting an order of songs of the playlist so that songs with a slower tempo are moved to the top of the playlist for sooner playing, while songs with a faster tempo are moved to the bottom of the playlist for later playing. Further still, the DAS module may, via the processor, change or replace the playlist or current playing song, by providing an alternate playlist.

In still another example, altering the music content may include, at 324, altering one or more of a volume, bass value, and tone of the music output. In some embodiments, the DAS system may include an "Alter the Playlist" sub-module configured to add or change an audio playback device in the vehicle to output softer and/or more soothing music, reduce the volume, reduce audio levels, such as bass, according to the driving and/or user behavior relative to a predetermined threshold.

In some embodiments, in addition to the music output, the output of one or more other vehicle control elements may be adjusted. For example, a cabin cooling may be adjusted.

At 326, the routine includes, continuing to monitor the user behavior following alteration of the music output. Herein, the DAS module may continue to monitor body position and body motion in relation to music streaming inside the vehicle cabin, as well as user driving behavior. In particular, the DAS module may monitor user behavior to determine whether the user behavior has become more stable following the adjusting of the music output. At 328, it may be determined if the user behavior is still indicative of reduced stability.

If the user behavior becomes stable within a threshold time since the music output is adjusted, at 332, further music output adjustments (e.g., music selected on the "Alter the Playlist" sub-module) may be canceled or skipped entirely and the original music output settings may be resumed. For example, changes to the volume and other playback levels, such as base, may be returned to the levels prior to the playback alteration or even higher levels. As an example, wherein the music volume was lowered in response to increased user instability, the volume level may be returned to a level higher than the previous original level when the driver's behavior becomes stable.

If the monitored user behavior remains below the threshold, and the user stability remains unsatisfactory (and erratic) after the adjusting of the music output, at 330, the routine includes indicating degraded user stability on a vehicle display to the user. For example, the user may be provided with a warning alerting them to their risky and erratic driving behavior. The indication or warning may be communicated via vehicle speakers, such as those coupled to the vehicle audio system. In addition, a visual display of the warming may be output to identify the user of the tracked driving behavior and receive an update regarding a status (e.g., speed of the vehicle).

Optionally, the vehicle control system may also automatically limit a maximum vehicle speed output. For example, the vehicle peak torque or peak speed may be reduced to avert potential vehicle collisions.

It will be appreciated that any of the modules and sub-modules and operations performed by the DAS system, such as modules and sub-modules pertaining to "Playlist/Song Analysis", "User Face/Gaze Analysis", "Driving Skill Analysis", "Alter the Playlist", "Monitor User Behavior", "System Collects Additional Info", and "Reduce the vehicle speed limit" may be hosted on a cloud system. In one example, the head unit of the vehicle may be in communication with one or more servers of such a cloud computing system.

Figure 4:
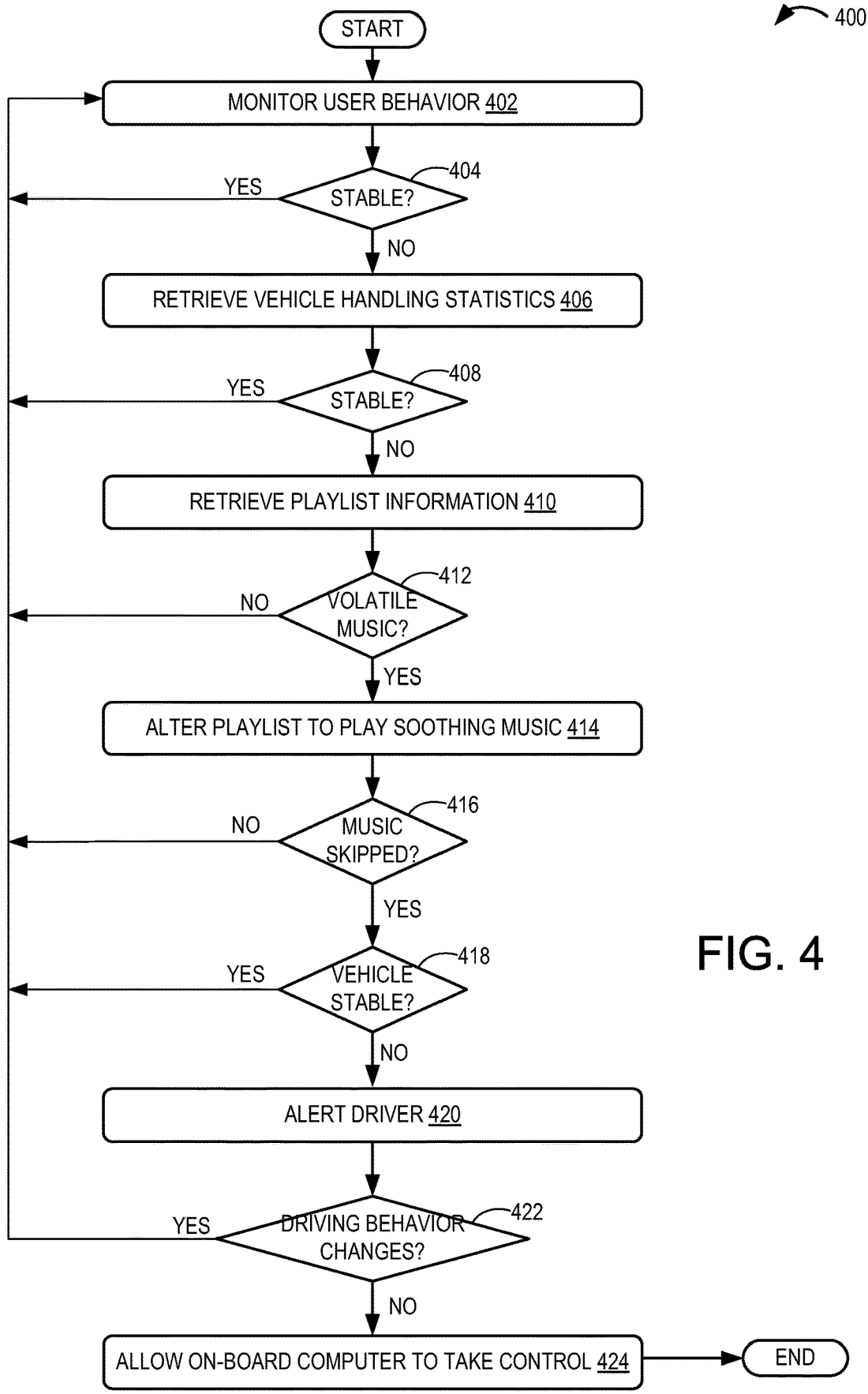
FIG. 4 shows a flow chart of adjustments to music streaming into a vehicle cabin based on monitored user behavior and driving performance.

An example adjustment according to the method of FIG. 3 is now described with reference to the routine of FIG. 4. The example operations of FIG. 4 may be performed by a DAS module of a computing device configured to be embedded in a vehicle, such as a vehicle computer with user inputs and outputs attached to the computer.

At 402, the DAS module may monitor user behavior, such as to monitor for and/or determine if a driver is distracted. This could be done through inward facing cameras, steering wheel sensors, and/or variations in seat sensors, for example. At 404, the module may confirm that the monitored user behavior is indicative of stable behavior before proceeding further. If the behavior is stable, at 406, the DAS module may determine and/or monitor vehicle handling by retrieving and going through user vehicle handling statistics. This may include checking how the vehicle is handled by the user, such as by checking for erratic acceleration, breaking lanes, erratic gear changes, steering wheel control, and frequent braking. At 408, as at 404, the module may confirm that the driving behavior is indicative of stability before proceeding further.

If the driving behavior indicates that the driver is stable, at 410, the DAS module may retrieve and monitor vehicle song and playlist information. This may include checking the attributes of the current song or songs in queue to help classify the music, such as classify genre, artist, beats per minute, and/or mood associated with the music. This information regarding the music playing inside the vehicle may help in a determination as to whether the music being played is volatile. At 412, it is confirmed that the music is volatile in that it may cause erratic behavior or driving before proceeding further. As such, a volatile music classification may be determined via historical information in general and/or historical information specific to the user or driver.

If the music being played is determined to be volatile, the DAS module may adjust the music output by skipping a song or terminating the music being played back. At 416, it may then be determined if music has been skipped by the user. For example, where the DAS module tries to alter the user behavior or mood through recommending or playing alternate (e.g., soothing) music, it may be determined if the user has manually skipped a DAS module selected song and/or at least tried to skip the DAS module selected song. The vehicle control system may determine if more than a threshold (e.g., more than one) number of songs have been skipped. If the skipping happens more than a threshold number of times, the module may determine or infer a user mood or behavior classification (or index) based on this (skipping) behavior and act accordingly. In particular, if the skipping happens more than a threshold number of times, at 418, the module may confirm vehicle stability before alerting a driver at 420 that their driving or and/or behaving is in an erratic way.

At 422, it may be determined if the user's driving behavior has changed since the adjustment to the music and the alert display. If the alert is ignored, as determined based on user behavior and vehicle status remaining unchanged, the DAS module may automatically allow an on-board computer to take at least partial control of the vehicle. For example, the DAS module may limit the speed of the vehicle or the acceleration capabilities of the vehicle. As such, the alert of the vehicle control system may be modified to be visual via a display and/or audio via speakers, for example.

In another example, the vehicle control system may control a maximum speed of the vehicle, such as according to proscribed speed limits and/or other driving environment conditions, such as weather conditions. The maximum speed of the vehicle may also be determined based on a geographic database that includes speed limits of different locations.

In one example, the DAS module may utilize user-based inputs (such as inputs regarding radio station channel changing) to determine whether the user is distracted. Whether based on the music played and/or the behaviors of the user, if the user seems distracted, the vehicle control system may modify the music, or change another environmental attribute in the vehicle, such as climate, to reduce the amount of distraction and redirect the user to pay attention. For example, music can be altered in various ways that have been already found to limit distracted driving in the given driver (or an average driver). Where the user is determined to be ignoring the change in audio playback, such as by changing the song or going back to the previously played song or lowering the volume, the vehicle system may take corrective measures in accordance, such as by adjusting parameters of the vehicle control and/or the audio playback. As another option, the vehicle control system may change the cabin ventilation system to blow noticeable patterns of warm and/or cold air into the vehicle cabin space.

Further still, the vehicle control system may alert other drivers, if the user or driver of the current vehicle does not become a stable driver. For example, nearby drivers, nearby members of the driver's social networking group, or even a law-enforcement official (e.g., police) may be configured as automatic recipients of such an alert. In one example, such recipients may receive the alerts via a DAS module embedded in their own vehicle, or by automation of honking of the vehicle's horn in a predetermined pattern. In another example, police may be alerted via vehicle-to-vehicle communications and/or vehicle-to-infrastructure communications.

In one specific example, changing the audio playback may include muting the playback so that no music is output into the vehicle cabin transiently. Also, the vehicle control system may discriminate between different songs. For example, the system up-tempo songs that are likely to lead to driver distraction or speeding may be skipped. The controller may monitor the tempo and other metadata of the song to determine the characteristics of the song. If the user does not slow down the tempo of the streaming music, or the speed of driving the vehicle, the vehicle control system may automatically turn down the volume or change the song. If the user slows down below a certain threshold, the song may continue to play. An alert could also be played in the vehicle to warn the driver that if the driver does not reduce speed, the song will be changed or the volume may be turned down or muted completely. In the case of users that determine a workaround for the DAS module, continual updates to the system may be made to remedy such workarounds. These updates may be communicated via a network interface of the DAS.

As such, audio playback may not always be the cause for erratic behavior or driving. To address this issue, in some examples, the DAS module may further determine if the audio playback is the cause for driver instability. This may be determined via analysis of historical driving patterns of the user and drivers in general. Information regarding behavior during playback of certain types of music can be stored and used for determining whether music is the cause for erratic behavior or driving. To achieve this, the DAS module may perform a verification check before adjusting audio playback, such as when audio streaming is first initiated on a vehicle drive cycle.

Figure 5:
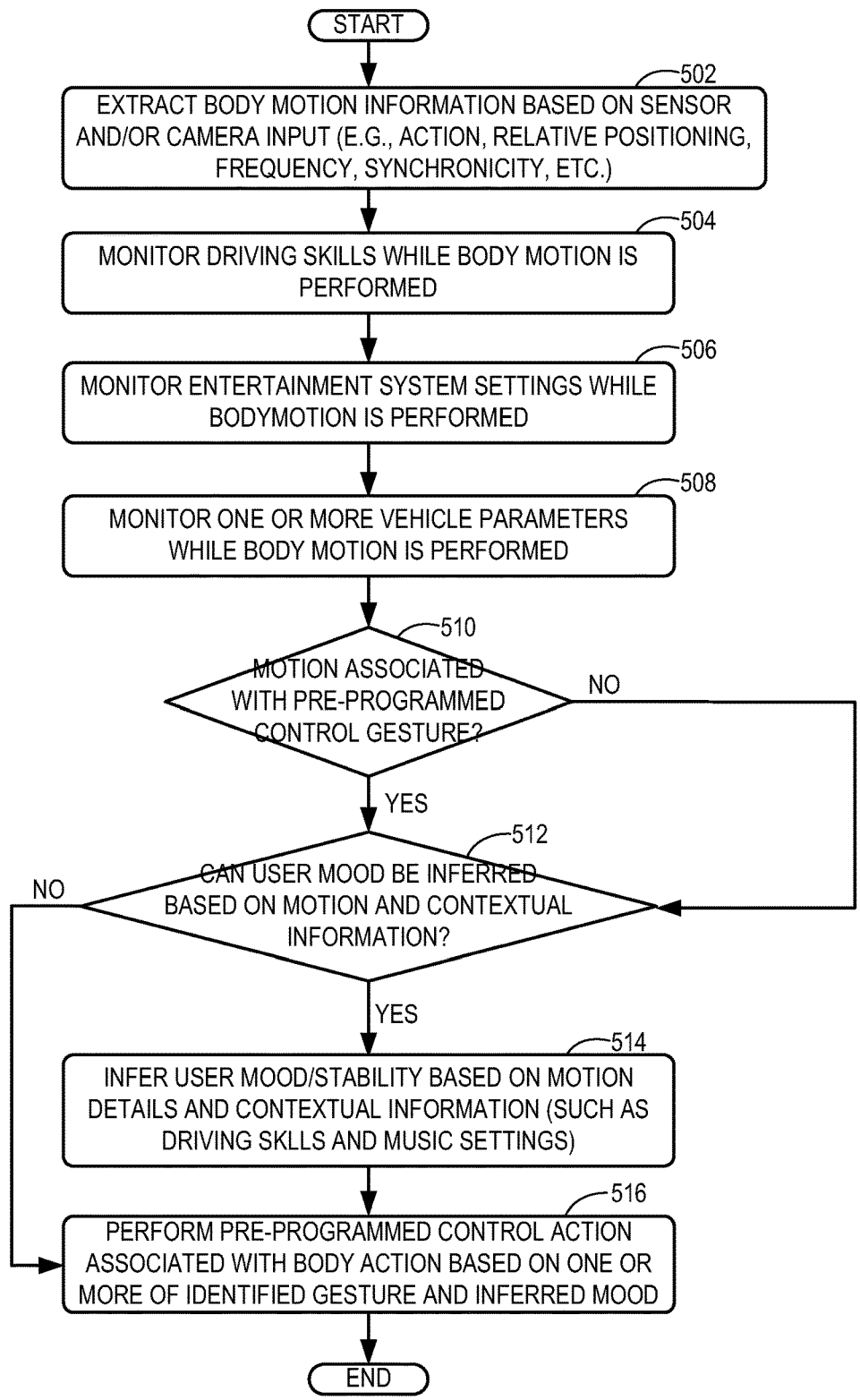
FIG. 5 shows a high level flow chart for estimating a user mood and identifying a control action gesture based on monitored user behavior, and adjusting vehicle infotainment settings in response to both the gesture and the mood.

Now turning to FIG. 5, an example method 500 is shown for adjusting vehicle control element settings differently based on user behavior indicative of user stability and user mood relative to user behavior indicative of a control gesture. The method allows distinct user behaviors and control gestures to be differentiated and vehicle control elements to be adjusted in accordance. The method also allows vehicle control elements to be adjusted based on user behavior that is indicative of user mood as well as of a control gesture. In this way, reckless driving is addressed without degrading a user's driver experience.

At 502, the routine includes monitoring user behavior including body motion while music is playing inside the vehicle cabin. The monitoring includes receiving and extracting sensor data and camera data. The controller may then extract body motion information from the sensor and camera data to identify one or more gestures. The extracted information may include a nature of the action performed, a relative positioning of the gesture with relation to other body portions of the user and/or with relation to the location of vehicle elements (such as relative to a steering wheel position), a frequency of the gesture, a synchronicity or rhythmic performance of the gesture, etc.

At 504, the controller may monitor driving skills and driving behavior of the user while the action or body motion is being performed and while music is playing inside the vehicle. For example, the controller may monitor user driving maneuvers while music inside the vehicle, the driving maneuvers including one or more of speed changes, lane changes, acceleration and deceleration events, braking events, etc.

At 506, the controller may monitor infotainment system settings, such as audio settings, phone settings, etc., while the action or body motion is being performed, and while the music is playing. At 508, the controller may monitor one or more other vehicle parameters while the action or body motion is being performed. These may include, for example, cabin temperature settings, vehicle seat and steering wheel position settings, window and sun roof settings, etc.

The controller may then identify each of a control gesture (or gestures) and a user mood based on the monitored user behavior. In particular, a historical change in the user body motion during the action in relation to the music playing inside the vehicle may be used to identify the user mood. In comparison, an instantaneous change in the user body motion during the action, independent of the music playing inside the vehicle, may be used to identify a control gesture. As an example, a single specific and distinct action, such as a swiping of the arm, may be identified as a control gesture. In comparison, a continuous and rhythmic action, such as bobbing of the head at the same frequency as the tempo of the music being streamed may be identified as behavior indicative of user mood.

At 510, it may be determined if the monitored action or body motion is associated with a pre-programmed control gesture. For example, the controller may compare the action to a gesture database to determine if the action is a control gesture. From 510, the routine proceeds to 512, where it may be determined if a user mood can be inferred based on the monitored action or body motion, and further based on contextual information. As an example, a quick swipe of the user's arm may be identified as a control gesture. However, frequent back and forth arm motion, in synchronicity with the streaming music, may be identified as user behavior indicative of user mood and not a control gesture. As another example, a single head bob may be identified as a control gesture while rhythmic head bobbing along with a rapid increase in risky driving maneuvers, such as frequent lane changes, may be associated with user mood.

If the action is associated with a control gesture only and not associated with user mood inference, at 516, the routine performs a pre-programmed control action associated with the identified gesture. For example, the controller may perform a pre-programmed adjustment to the music based on the identified control gesture. If the action is associated with user mood inference only and not associated with a control gesture, at 514, the routine determines or infers the user mood and/or user stability index based on the action details and further based on contextual information, such as driving skills and music settings. For example, the controller may infer an improved mood or higher stability index when the body action is accompanied by safe driving maneuvers, while inferring a degraded mood or lower stability index when the body action is accompanied by risky or reckless driving maneuvers. From 514, the routine proceeds to 516 where the controller performs an adjustment to a vehicle control element based on the identified user mood. For example, as described earlier with reference to FIG. 3, if the inferred user mood is associated with reduced driver stability, vehicle music settings may be altered to improve the user mood and provide for a calmer ambience. In comparison, if the inferred user mood is associated with driver stability, vehicle music settings may be maintained.

In some examples, based on the user body motion, the controller may identify a number of possible moods and their respective weightage. The music adjustment may then be performed based on the identified moods and their respective weightage.

In one example, the controller may perform a first adjustment to the music playing inside the vehicle based on the identified control gesture, and perform a second, different adjustment to the music playing inside the vehicle based on the identified mood. Herein, the identified control gesture and identified mood may be determined based on distinct body actions or a common body action. For example, where the music playing inside the vehicle includes a playlist, the first adjustment responsive to the control gesture only may include one or more of skipping a song on the playlist, repeating a song on the playlist, increasing a volume of the music, decreasing a volume of the music. In comparison, the second adjustment responsive to the user mood only may include one or more of selecting an alternate playlist having songs with a slower tempo, decreasing a volume of the music, reducing a bass component of the music, slipping a song on the playlist, and changing an order of songs on the playlist.

If the user body action or motion is associated with a pre-programmed control gesture at 510, and can also be used to infer a user mood at 512, then at 516, the controller may perform an adjustment to a vehicle control element based on each of the identified user mood and the identified control gesture. In one example, the controller may perform a pre-programmed adjustment to the music based on the identified control gesture, with a degree of the pre-programmed adjustment based on the identified mood.

As an example, a controller may identify a swipe gesture of the user as a control gesture used to vary a volume of music playing in the cabin. Based on concurrent head bobbing, the controller may infer that the user is in a good mood and there is no reckless driving. Accordingly, the controller may learn the angle of approach or trajectory of the swipe as a function of the user's (good) mood and allow for a larger increase in volume. In comparison, if the controller had inferred that user was in a bad mood and was driving in a risky manner, the controller may learn the angle of approach or trajectory of the swipe as a function of the user's (bad) mood and not allow for a larger change in volume. The controller may either reduce the change in volume allowed, or override the increase in volume by decreasing the volume instead.

While not displayed in FIG. 5, it will be appreciated that in the routine of FIG. 5, as in the routine of FIG. 3, following adjustment to the music settings, the controller may reassess user behavior and driving performance. In response to a less than threshold change in user mood after adjusting the music playing inside the vehicle, the controller may reduce a vehicle speed limit and indicate degraded user stability on a vehicle display to the user.

In one example, a driver assistance system comprises a processor with computer readable instructions stored on non-transitory memory for: monitoring body motion of a vehicle driver while listening to music streaming from an in-vehicle infotainment system based on input received from one or more vehicle sensors; monitoring a driving behavior of the driver while listening to the music based on driving maneuvers executed by the driver; estimating a user stability index based on the monitored body motion and driving behavior; and altering a content of the music in response to the estimated user stability index being lower than a threshold value. Monitoring the body motion may include identifying a first body motion corresponding to a user mood manifestation and distinguishing the first motion from a second body motion corresponding to a vehicle control actuating gesture. Estimating a user stability index may be based on the first body motion and not the second body motion.

The controller may include further instructions for actuating a vehicle control element responsive to the second body motion and not the first body motion. The controller may include still further instructions for: altering the music content based on a user-indicated preference responsive to the second body motion; and altering the music content independent of the user-indicated preference responsive to the first body motion. The controller may further monitor a change in body motion and a change in driving behavior of the driver responsive to the altering of the music content; and in response to the estimated user stability index remaining lower than the threshold value after the altering, limiting a maximum speed of the vehicle.

Figure 6:
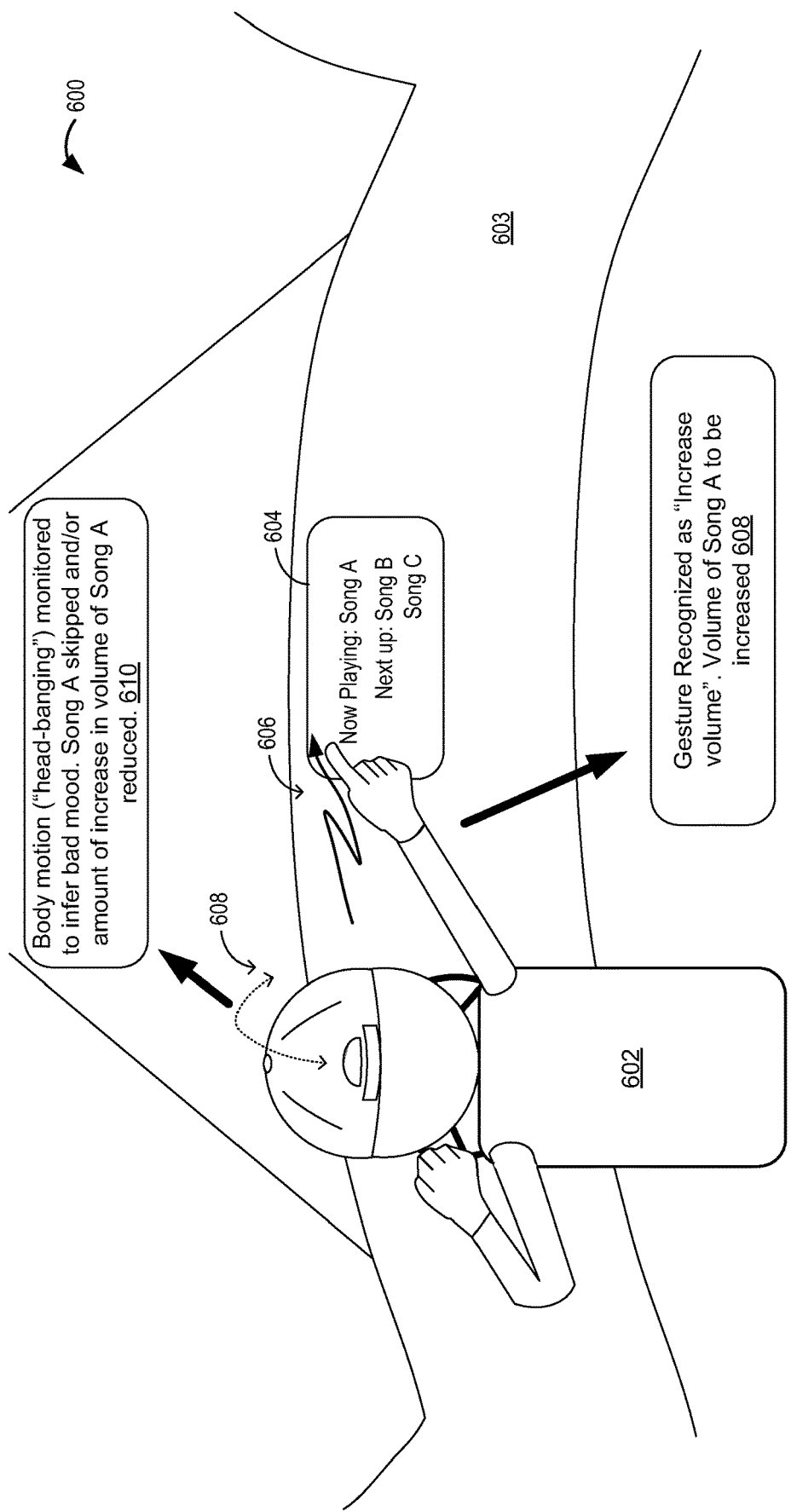
FIG. 6 shows an example vehicle music setting adjustment responsive to inferred user mood and identified user control action gesture.

Now turning to FIG. 6, an example scenario 600 is described depicting adjustment of a vehicle audio system setting based on each of a gesture and user body action performed concurrently and further performed while music is streaming inside the vehicle.

In the depicted example, a vehicle driver or user 602 is operating a vehicle 603. The vehicle includes an audio system 604 which is playing music into the vehicle cabin. In the depicted example, at the time of the example scenario, a playlist of songs is being streamed on the audio system with a first Song A currently playing, and an indication of the subsequent songs is provided to the operator. In the given example, Song A may be of a higher tempo and may belong to a heavy metal genre of music. In comparison, Song C may be of a slower tempo and may belong to a soft rock genre of music.

User 602 may perform multiple actions concurrently. In particular, the user may swipe their right hand to perform gesture 606 to indicate that they wish to raise the volume of music while listening to Song A. At the same time, the user may be performing a mood-indicative action 608 (head-banging) in synchronization with the tempo of Song A. While head-banging, the user may be distracted and may be driving erratically.

Based on the given combination of actions, a vehicle controller (or a DAS module therein) may determine that the user mood index is lower, or that the driver's driving stability is reduced. Thus, although gesture 606 requesting an increase in volume is recognized, in view of body motion 608, gesture 606 may be overridden. Specifically, the controller may not increase the volume of Song A but instead may skip Song A and play Song C. In an alternate example, the controller may allow Song A to continue but may reduce the amount of increase in the volume of Song A. In other words, the driver requested increase in volume may not be provided. If the user driving behavior improves after reducing the volume or skipping the song, the original playlist order and/or volume settings may be resumed.

In this way, adjustments to in-vehicle music settings can be performed based on driver behavior to reduce vehicle collision risks. By adjusting the music settings to provide for a calmer in-vehicle ambience during conditions when the user behavior is indicative of degraded user mood, user driving performance can be improved and reckless driving maneuvers can be averted. By using contextual information regarding user body motion and position changes in a vehicle while music is playing in the vehicle to better identify and distinguish control gestures and driver stability/instability behavior, in-vehicle controls may be improved. Overall, driver and vehicle safety is better enabled.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as electronic computing device 100 described with reference to FIG. 1. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" is to be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising:
adjusting an aspect of music output currently playing inside a vehicle via a vehicle infotainment system responsive to monitored user behavior inside the vehicle, the monitored user behavior including one or more user body positions and one or more user body motions from which a user mood and a vehicle control input for controlling a vehicle operation are discerned by the vehicle infotainment system, the aspect of the music output being adjusted to a degree that is based on the user mood, the aspect of the music output being adjusted to a first degree responsive to the monitored user behavior manifesting a first user mood, and the aspect of the music output being adjusted to a second degree responsive to the monitored user behavior manifesting a second user mood, the first degree being a larger increase in the aspect of the music output than the second degree, and the first user mood being less indicative of erratic driving behavior than the second user mood, wherein the aspect of the music output that is adjusted includes a volume of a current song that is currently playing inside the vehicle, and an equalization of the current song that is currently playing inside the vehicle,
wherein the method further includes determining the user mood by determining a number of possible moods of a user and giving a weightage to each of the possible moods based on the monitored user behavior.

2. The method of claim 1, wherein the user body position and user body motion are monitored via one or more of a camera and a biometric sensor coupled in the vehicle to determine user biometric behavior, and wherein the monitored user behavior includes a combination of the user biometric behavior and a user driving behavior.

3. The method of claim 2, wherein the user body position and user body motion monitored are a first body position or body motion indicative of user behavior, the first body position or body motion distinct from a second body position or body motion indicative of a vehicle control actuating gesture, wherein the method further includes adjusting the aspect of the music output differently responsive to the second body position or body motion as compared to an adjustment of the aspect of the music output responsive to the first body position or body motion, and wherein the method further comprises presenting an alert in the vehicle to warn a driver that the aspect of the music output will be adjusted responsive to the monitored user behavior.

4. The method of claim 3, wherein the first body position and body motion are monitored historically in relation to the music output of the vehicle infotainment system, wherein the second body position or body motion is not monitored historically, and wherein the user body motion is identified as being associated with the user mood responsive to determining that the user body motion is in synchronicity with the music output.

5. The method of claim 4, wherein the adjusting the aspect of the music output comprises changing from original music output settings to adjusted music output settings in response to the monitored user behavior being lower than a threshold, wherein the monitored user behavior being lower than the threshold manifests a user mood associated with reduced driver stability, and wherein the original music output settings are resumed responsive to determining that the monitored user behavior is determined to manifest a user mood associated with an increased driver stability after adjusting the aspect of the music output.

6. The method of claim 5, wherein adjusting the aspect of the music output includes adjusting a bass value and/or a tone of the current song that is currently playing inside the vehicle, the method further comprising determining a mood index by correlating one or more parameters of the music output with user behavior, wherein a request for increasing the volume of the current song that is currently playing inside the vehicle is overridden or increased by the second degree responsive to determining that the mood index is lower than a threshold.

7. The method of claim 5, wherein the music output includes a playlist that is currently playing, wherein the method further comprises adjusting one or more of a content of the playlist and an order of songs of the playlist, and wherein adjusting the content of the playlist includes removing or skipping one or more songs in the playlist that have a tempo above a tempo threshold, a volume above a volume threshold, a bass value above a bass threshold, or that belong to a first selected genre, and adding to or repeating one or more songs in the playlist that have a tempo below the tempo threshold, a volume above the volume threshold, a bass value below the bass threshold, or that belong to a second selected genre.

8. The method of claim 1, further comprising monitoring a user driving behavior, the user driving behavior monitored historically in relation to the monitored user behavior inside the vehicle, wherein the adjusting of the music output is further based on the monitored user driving behavior, and wherein the adjusting of the aspect of the music output is requested by a control gesture, wherein the control gesture is a swipe gesture, a parameter of the swipe gesture being interpreted as a function of the user mood to control the adjusting of the aspect of the music output, the volume of the current song that is currently playing inside the vehicle being adjusted to a first volume responsive to the monitored user behavior manifesting the first user mood, and the volume of the current song that is currently playing inside the vehicle being adjusted to a second volume responsive to the monitored user behavior manifesting the second user mood, the first volume being higher than the second volume.

9. The method of claim 7, further comprising, in response to the monitored user behavior remaining below the threshold after the adjusting of the aspect of the music output, automatically limiting a maximum vehicle speed output and indicating degraded user stability on a vehicle display.

10. A method, comprising:
monitoring a user behavior comprising one or more user body positions and one or more user body motions while music is playing inside a vehicle via one or more speakers of the vehicle;
identifying a control gesture based on the monitored user behavior;
identifying a change in a parameter of the music currently playing inside the vehicle based on the identified control gesture, wherein the control gesture is identified as a request for the change in the parameter of the music currently playing inside the vehicle;
identifying a user mood based on the monitored user behavior;
adjusting the music currently playing inside the vehicle by making the change to the parameter requested by the identified control gesture, wherein an amount of the change in the parameter that is performed is based on the identified user mood, wherein when a first user mood is identified, a first amount of change in the parameter is made, and when a second user mood is identified, a second amount of change in the parameter is made, the first amount being larger than the second amount, the parameter including a volume of speaker output of the one or more speakers outputting the music currently playing inside the vehicle, a distribution of sound across the one or more speakers outputting the music currently playing inside the vehicle, and/or an equalization of the one or more speakers outputting the music currently playing inside the vehicle; and
selectively performing a vehicle control adjustment associated with the identified control gesture based on the identified user mood, the vehicle control adjustment being performed to a degree that is based on the identified user mood, the vehicle control adjustment including a reduction of a vehicle speed limit of the vehicle.

11. The method of claim 10, wherein monitoring user behavior includes monitoring a historical change in body motion in relation to the music currently playing inside the vehicle and an instantaneous change in body motion independent of the music currently playing inside the vehicle, and wherein the user mood is identified based on the historical change in body motion while the control gesture is identified based on the instantaneous change in body motion.

12. The method of claim 11, wherein the adjusting further includes performing a first adjustment to the music currently playing inside the vehicle based on the identified control gesture and performing a second, different adjustment to the music currently playing inside the vehicle based on the identified user mood.

13. The method of claim 12, wherein the music currently playing inside the vehicle includes a playlist, and wherein the first adjustment includes skipping a song on the playlist, repeating a song on the playlist, increasing a volume of the music, and/or decreasing the volume of the music, and wherein the second adjustment includes selecting an alternate playlist having songs with a slower tempo, decreasing the volume of the music, reducing a bass component of the music, skipping a song on the playlist, and/or changing an order of songs on the playlist, the second adjustment overriding the first adjustment responsive to determining that the identified user mood corresponds to a reduced driving performance.

14. The method of claim 11, wherein the vehicle control adjustment includes performing a pre-programmed adjustment to the music associated with the identified control gesture, a degree of the pre-programmed adjustment to the music based on the identified user mood, the identified control gesture including a first swiping gesture when the identified user mood is the first user mood and the identified control gesture including a second swiping gesture when the identified user mood is the second user mood, the first swiping gesture having a distinct trajectory relative to the second swiping gesture.

15. The method of claim 11, further comprising monitoring user driving maneuvers while music is playing inside the vehicle, the user driving maneuvers including one or more of speed changes, lane changes, acceleration events, and braking events, and further identifying the user mood based on the historical change in body motion in relation to the monitored user driving maneuvers as correlated with one or more parameters of the music that is currently playing inside the vehicle, the one or more parameters of the music including a tempo, a volume, a genre, and a bass component of the music.

16. The method of claim 15, further comprising:
in response to a less than threshold change in user mood after adjusting the music currently playing inside the vehicle,
reducing the vehicle speed limit; and
indicating degraded user stability on a vehicle display to a user.

17. A driver assistance system, comprising:
a processor with computer readable instructions stored on non-transitory memory for:
monitoring body motion of a vehicle driver while listening to music streaming from an in-vehicle infotainment system based on input received from one or more vehicle sensors, the music including one or more songs;
monitoring a driving behavior of the driver while listening to the music based on driving maneuvers executed by the driver and detected by one or more vehicle controls for controlling operation of a vehicle;
estimating a user stability index based on the monitored body motion and the monitored driving behavior while the driver is listening to a currently-playing song of the one or more songs;
altering a volume of the currently-playing song, a distribution of sound of the currently-playing song, and an equalization of the currently-playing song in response to the estimated user stability index being lower than a threshold value, the threshold value being indicative of a user mood associated with reduced driver stability;
detecting a user action associated with a control gesture; and
responsive to detecting the user action, performing a control action associated with the control gesture, the control action including a change in the volume of the currently-playing song and/or the equalization of the currently-playing song, the control action being performed to a first degree responsive to estimating a first user stability index, and the control action being performed to a second degree responsive to estimating a second user stability index, the first degree being a larger degree than the second degree,
wherein monitoring the body motion includes identifying a first body motion corresponding to a user mood manifestation that indicates whether the driving behavior is stable or erratic and distinguishing the first body motion from a second body motion corresponding to a vehicle control actuating gesture, wherein the estimating the user stability index is based on the first body motion and not the second body motion, and wherein the processor includes further instructions for actuating a vehicle control element responsive to the second body motion and not the first body motion.

18. The system of claim 17, wherein the driving maneuvers include one or more of lane changes, acceleration and deceleration events, and braking events, and wherein the processor includes further instructions for:
altering the music based on a user-indicated preference responsive to the second body motion; and
altering the music to decrease the volume, a tempo, and/or a bass component of the music independent of the user-indicated preference responsive to the first body motion.

* * * * *